United States Patent
Covell et al.

(12)

(10) Patent No.: US 6,206,260 B1
(45) Date of Patent: *Mar. 27, 2001

(54) MULTI-PURPOSE AUTOMOTIVE CONSOLE DEVICE

(75) Inventors: Douglas G. Covell, Columbus; Jeffrey T. DeBord, Worthington; Gregory R. Drobeck, Columbus; Sean D. Montag, Westerville; Peter A. Koloski, Columbus, all of OH (US)

(73) Assignee: Lancaster Colony Corp., Columbus, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,711

(22) Filed: Sep. 10, 1997

(51) Int. Cl.⁷ ........................................................ B60R 7/06

(52) U.S. Cl. .................... 224/539; 224/552; 224/567; 206/5; 206/561; 206/564

(58) Field of Search ..................................... 224/296, 552, 224/554, 539, 275, 540, 567, 571; 296/37.8, 37.1, 37.15; 248/311.2, 902; 297/188.14, 188.15, 188.16, 188.17; 206/561, 564, 5, 6; 220/631, 629, 630, 23.87, 23.89; D12/419

(56) References Cited

U.S. PATENT DOCUMENTS

| D. 224,280 | 7/1972 | Price . |
| D. 232,871 | 9/1974 | George . |
| D. 248,056 | 5/1978 | Nepper . |

FOREIGN PATENT DOCUMENTS

9008671 * 8/1990 (WO) ................................ 296/37.15

OTHER PUBLICATIONS

"Allied Plastics Inc."—In–Car Convenience Consoles brochure © 1990.
"Allied Plastics Inc."—New Items materials dated "effective Apr. 1, 1988".
"Rubber Queen®"—Now Bigger Better brochure © 1982.
Miscellaneous Allied Plastics advertising materials © 1989.
"Rubber Queen®"—Interior Auto Accessories materials (1 page).
"Rubber Queen®" Consolette Litterbasket/Snack Tray No. 6250.

*Primary Examiner*—Stephen Castellano
(74) *Attorney, Agent, or Firm*—Dinsmore & Shohl

(57) ABSTRACT

A console device for vehicles which includes a multiple use storage area having a bottom wall and an upwardly extending peripheral wall with an upwardly extending peripheral wall about at least a portion of that bottom wall defining a receiving recess with front and rear surfaces. A divider member extends upwardly from the bottom wall within the recess and between the front and rear surfaces, and features an arcuate cross-sectional conformation. A space is provided on the bottom wall between the divider member and at least one of the front and rear surfaces. At least one opening is also provided for receiving the lower portions of a cup or similar drinking vessel, with that opening including a bottom wall, front and rear walls, and at least one sidewall member generally defining a cup receiving area. An adjustable cupholder arm extends between the front and rear walls and includes an inner edge for defining an adjustable portion of the cup receiving area. The holder arm is adjustably attached to one of the front or rear walls, and a plurality of corresponding interlocking elements are provided on the holder arm and the wall to which the holder arm is attached for selective adjustment and locking of the holder arm relative to the sidewall member. A generally open receiving area is also provided, and a removable storage member is selectively and at least partially received in the receiving area in one of a plurality of stable and distinct use positions relative to the receiving area.

24 Claims, 7 Drawing Sheets

U.S. PATENT DOCUMENTS

| | | |
|---|---|---|
| D. 267,444 | 1/1983 | Ruxton . |
| D. 271,442 | 11/1983 | Lehner . |
| D. 271,541 | 11/1983 | Rockwell . |
| D. 307,355 | 4/1990 | Page, Jr. . |
| D. 317,674 | 6/1991 | Smith . |
| D. 322,356 | 12/1991 | Harshaw et al. . |
| D. 323,932 | 2/1992 | Hudgens . |
| D. 327,364 | 6/1992 | Mankey . |
| D. 328,973 | 9/1992 | Mankey . |
| D. 352,495 | 11/1994 | Mawhinney et al. . |
| D. 362,837 | 10/1995 | Mankey et al. . |
| D. 363,698 | 10/1995 | Smith . |
| D. 368,889 | 4/1996 | Mankey et al. . |
| D. 375,719 | 11/1996 | Schlangen et al. . |
| 2,203,402 * | 6/1940 | Bausch ................. 206/6 |
| 2,332,266 * | 10/1943 | Segal .................... 206/6 |
| 2,522,909 | 9/1950 | Wadanoli . |
| 2,640,595 | 6/1953 | Byford . |
| 2,726,710 | 12/1955 | Cutler . |
| 2,805,766 * | 9/1957 | Nathan ................... 206/6 |
| 3,291,429 * | 12/1966 | Neanhouse ............ 248/902 |
| 3,304,143 | 2/1967 | Connell . |
| 3,804,233 * | 4/1974 | Gregg, Jr. ............. 224/926 |
| 3,873,010 * | 3/1975 | Patterson .............. 224/275 |
| 4,106,829 | 8/1978 | Dolle et al. . |
| 4,300,709 | 11/1981 | Page, Jr. . |
| 4,809,897 | 3/1989 | Wright, Jr. . |
| 4,821,931 | 4/1989 | Johnson . |
| 4,928,865 | 5/1990 | Lorence et al. . |
| 5,072,909 * | 12/1991 | Huang ................ 248/311.2 |
| 5,149,032 | 9/1992 | Jones et al. . |
| 5,190,259 | 3/1993 | Okazaki . |
| 5,195,711 | 3/1993 | Miller et al. . |
| 5,205,452 | 4/1993 | Mankey . |
| 5,246,151 | 9/1993 | Jabara . |
| 5,280,848 | 1/1994 | Moore . |
| 5,520,313 | 5/1996 | Toshihide . |
| 5,601,268 * | 2/1997 | Dunchock ............ 224/926 |

* cited by examiner

MULTI-PURPOSE AUTOMOTIVE CONSOLE DEVICE

TECHNICAL FIELD

This invention relates to multi-purpose devices for use in vehicles for receiving and storing a variety of objects including cups, eyeglasses, writing utensils and the like, and more specifically to a console device with a multiple use storage area which includes a generally arcuate divider member for receiving and storing eyeglasses in a position which obviates a need for undesirable contact of the lens surfaces of the eyeglasses while providing an at least partially divided space for also receiving other items for storage. Preferred embodiments of the invention further include at least one cup receiving area having an adjustable cupholder arm which can be selectively adjusted and locked into position for receiving cups of various sizes; and a removable storage member having a plurality of stable and distinct use positions.

BACKGROUND ART

Over the years, a relatively wide variety of vehicle console devices have been provided in the form of cupholding apparatuses, eyeglass holders, and general or multi-purpose receiving and storage arrangements. For example, a combination eyeglass holder and tissue dispenser is shown in U.S. Pat. No. 2,522,909 (Wadanoli), wherein a pack of cleansing tissues is supported in a casing against the underside of a cover having an opening shaped to receive a pair of eyeglasses in a folded, flat condition. Similarly, a large number of mutiple purpose console devices such as shown in U.S. Des. Pat. Nos. 248,056; 362,837; 368,889; 352,495; and 327,364, include a variety of object receiving spaces which can receive eyeglasses, cups, writing utensils and the like. As can be appreciated from a review of these prior structures, however, generally one had to choose between a dedicated eyeglass holder device such as shown in the Wadanoli patent, or settle for a multi-purpose device having item receiving areas which are generally not well adapted for receiving eyeglasses, or for supporting glasses in a manner so as to minimize the likelihood of abrasions, scratches or wear from inevitable interaction with the console structure or other items stored therewithin.

Previously, there have also been a variety of devices providing cupholding spaces for receiving cups and other drinking vessels of different sizes. Some of these devices have provided the cupholding spaces in a permanent or universal manner such as can be seen in the design patents to Mankey et al. (e.g., U.S. Des. Pat. Nos. 327,364; 368,889; and 362,837) and the design patent to Mawhinney et al. (U.S. Des. Pat. No. 352,495) which show multiply stepped concentric cup receiving openings to accommodate a plurality of cup bottom sizes. Obviously, with such permanently established steps, these devices can only accommodate a predetermined range of cup size variation, with varying degrees of stability.

A number of collapsible and/or adjustable cupholding apparatuses and arrangements have also been provided. U.S. Pat. No. 5,190,259, which issued to H. Okazaki, for example, shows a cupholding apparatus wherein a spring-loaded rotatable assembly automatically opens a cupholder to its predetermined use position upon opening of the hingeable lid and base portions. The device is thereby foldable to a closed and compacted condition, and automatically opens to its use position upon hinged opening of the lid and base. A cupholder which can be adjusted to receive a beverage container of a variety of diameters is shown in U.S. Pat. No. 5,149,032, which issued to S. Jones et al. This device contemplates a pair of fitxed upright arms (14 and 16), an adjustable unit (18) carried on base (12), and a pair of movable upright arms (20 and 22). Unit 18 is adjusted by incremental shifting of a ratcheting pawl assembly (56) once the device is adjusted to a desired position. A locking means (64) can be utilized to lock the rachet and pawl system against further movement, whereby a small boss (70) on the inside of each of the pawls is caused to seat within a corresponding notch (72) formed in the edge of the locking means. As is clear from a review of the Jones et al. specification and drawings, however, this device is relatively complex and requires numerous interacting parts for its operation.

Another container holder designed to accept one or two containers and including an arrangement to receive containers of different sizes is shown in U.S. Pat. No. 5,195,711, which issued to G. Miller et al. In this arrangement, container support assemblies include resilient disks (e.g., sheets of polymeric foam) designed to receive the lower portions of containers of different sizes in a snug arrangement. Similarly, U.S. Pat. No. 4,821,931 which issued to R. Johnson, contemplates a multi-purpose article holding tray which includes a chamber (74) for receiving a liquid container, including a compressible foam insert (82) for receiving a soft drink can, coffee mug, or the like. While these arrangements are arguably simpler than the adjustable arrangements such as shown in Jones et al., they have inherent restrictions as to variations among the containers to be received, as well as problems associated with the uniformity of stability of containers of varying sizes.

An additional problem with universally applicable console designs has been the ability to utilize such devices in a number of the widely varying vehicle configurations in the marketplace. Additionally, security concerns have made the removability of storage devices and/or portions of console storage arrangements more important. For example, often a vehicle owner will wish to have the option to remove storage devices including cassette tapes, CD's or other valuable and easily accessible items; either taking such items with them or locking them separately in the trunk for safe keeping. In this regard, a number of prior console devices have provided for removable storage bins and removable portions of console devices. For example, U.S. Pat. No. 5,246,151 which issued to L. Jabara, includes several removable receptacles (litter bin 82 and cassette tape holder 84) which are normally housed within storage compartment 12.

Likewise, the Mawhinney et al. '495 design patent shows a vehicle console which includes a rear storage area having a hingeable lid and means for facilitating the storage of cassette tapes and CD's. In a preferred embodiment, such storage bin could be provided in a removable form, whereby the closed storage bin could be separated from the balance of the console as desired. The Mankey '364 design also shows an angled storage compartment similarly having adaptations for facilitating the storage of cassette tapes. Such an angled orientation has been found desirable for allowing access to a storage compartment without interference from the adjacent vehicle dashboard or other structures. Unfortunately, however, heretofore customers have been forced to choose among console devices having either permanent or removable storage bins, storage areas which are either permanently angled or permanently set in an upright position, and/or among console devices which are specifically adapted for particular vehicles and/or for holding particular items. These trade offs inevitably lead to less than optimal applicability and satisfaction in many instances.

Consequently, there has remained a continuing need for a more universal console device which can provide for any of a variety of these common needs without requiring multiple and different console structures. There has also remained a need for a console device which can provide a multiple use storage area which can selectively receive and support eyeglasses and a variety of other items, while minimizing the likelihood of damage to the lens surfaces. Finally, there has remained a continuing need for a console device which includes an adjustable cupholding opening for conveniently and adaptively receiving and supporting drinking vessels of various sizes and shapes in a uniformly stable condition.

DISCLOSURE OF THE INVENTION

It is an object of this invention to obviate the above-described problems and shortcomings of console devices previously available.

It is another object of the present invention to provide an improved console device which includes a multiple use storage area for selectively receiving and supporting eyeglasses and other items while minimizing undesirable contact of the lens surfaces of the eyeglasses, and while simultaneously providing a storage area adapted for also receiving any number of other small items to be stored.

It is yet another object of the present invention to provide a console device which includes at least one opening for receiving the lower portion of a cup or other drinking vessel, and which is quickly and conveniently adjustable to provide for uniform and stable support of vessels of various sizes and shapes.

It is also an object of the present invention to provide an open receiving area which can selectively receive a removable storage member which has a plurality of stable and distinct use positions relative to the receiving area.

It is yet another object of the present invention to provide a console device having a removable storage member which can be selectively oriented relative to the console device in one of a plurality of stable and distinct storage positions to facilitate access to the storage member while minimizing potential interference from surrounding structures.

It is another object of the present invention to provide a console device having a multiple use storage area having a divider member which simultaneously effectively divides the storage area into several distinct portions and allows for the support of eyeglasses in a position which obviates undesirable contact of the eyeglass lenses.

It is yet another object of the present invention to provide a more adaptable console device for vehicles which includes a multiple use storage area having a divider member which facilitates support of eyeglasses without contact of their lens surfaces, in combination with an adjustable cupholder storage area and/or a plurality of stable and distinct use positions.

In accordance with one aspect of the present invention, there is provided a console device for vehicles which includes a multiple use storage area having a bottom wall and an upwardly extending peripheral wall about at least a portion of that bottom wall defining a receiving recess with front and rear surfaces. A divider member extends upwardly from the bottom wall within the recess and between the front and rear surfaces, and features an arcuate cross-sectional conformation. A space is provided on the bottom wall between the divider member and at least one of the front and rear surfaces. At least one opening is also provided in the console for receiving the lower portions of a cup or similar drinking vessel, with that opening including a bottom wall, front and rear walls, and at least one sidewall member generally defining a cup receiving area. An adjustable cupholder arm extends between the front and rear walls and includes an inner edge for defining an adjustable portion of the cup receiving area. The holder arm is adjustably attached to one of the front or rear walls, and a plurality of corresponding interlocking elements are provided on the holder arm and the wall to which the holder arm is attached for selective adjustment and locking of the holder arm relative to the sidewall member. A generally open receiving area is also provided, and a removable storage member is selectively and at least partially received in the receiving area in one of a plurality of stable and distinct use positions relative to the receiving area.

In a preferred embodiment, the removable storage member has at least two stable and distinct use positions, including an upright position and a forwardly angled and display and storage position. Also, it is preferred that the divider member extend upwardly from the bottom wall such that its larger upright dimension is located adjacent the front surface of the receiving recess, and curves downwardly such that its smallest dimension is adjacent the bottom wall closer to the rear surface. The divider preferably terminates short of the rear surface such that the space is provided between the divider and the rear surface, which can conveniently provide storage space for writing utensils or the like. The removable storage member can also preferably include a hingeable lid which can also be removed or locked in an open condition for facilitating convenient access to its interior storage space.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 5 is a bottom perspective view of the adjustable cupholder arm of FIG. 5a;

DETAILED DESCRIPTION OF THE PREFERRED EMBODIMENTS

Figure 1:
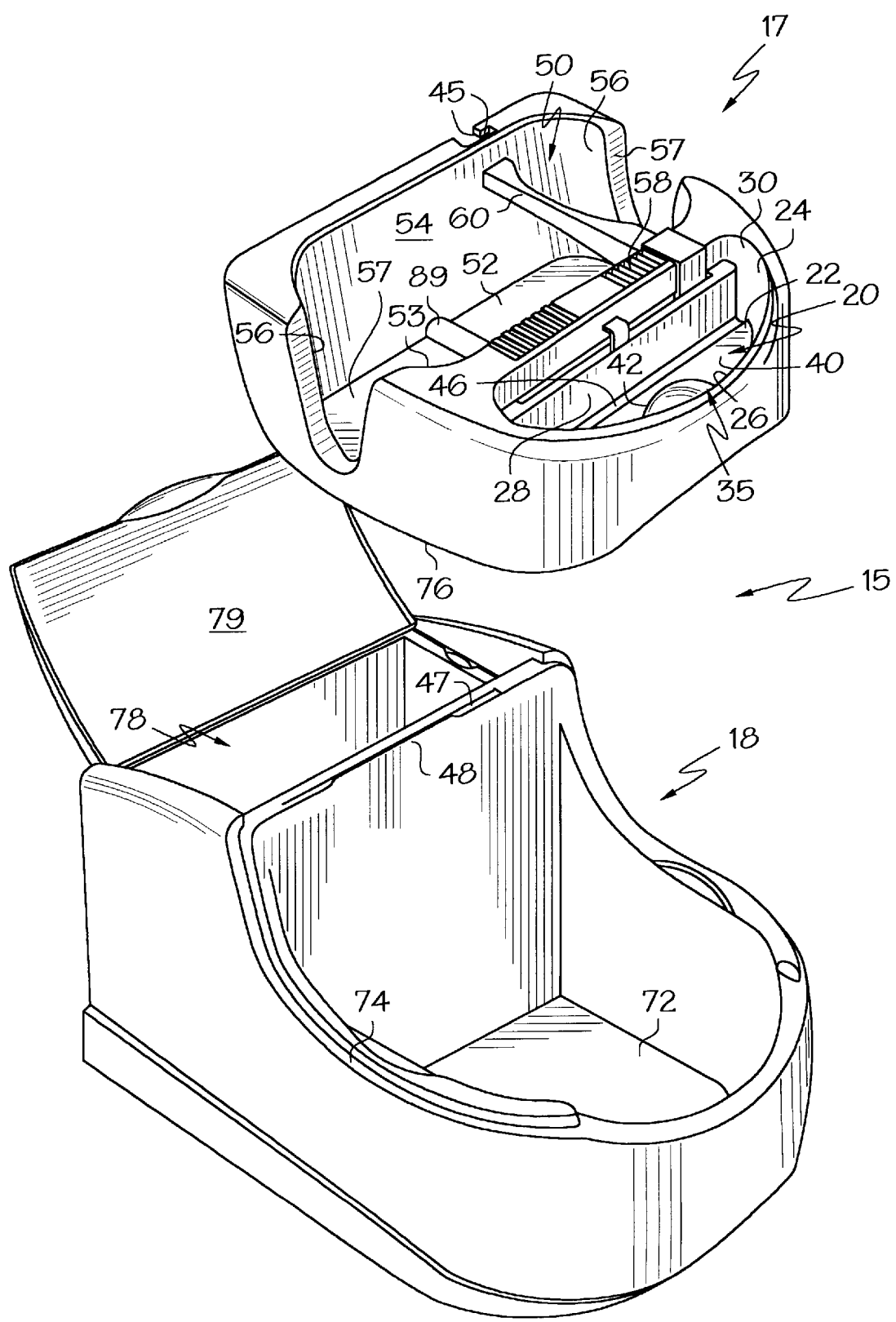
FIG. 1 is partially exploded and partially broken out perspective view of a console device made in accordance with the present invention.

Referring now to the drawings in detail, wherein like numerals indicate the same elements throughout the views, and wherein elements having the same final two digits (i.e., 15, 115, 215) indicate comparable elements of various preferred embodiments among the views, FIG. 1 illustrates a partially exploded and partially broken out perspective view of a console device 15 made in accordance with the present invention. This embodiment preferably comprises a first member 17 which can be removably and hingeably connected for use in conjunction with a base member 18, which includes a front storage compartment 72 defined by an upwardly extending wall having a console ledge 74 around its upper periphery. A rear storage area 78 is also provided with a hingeable lid 79 for convenient access to the interior space, which may optionally receive a removable tray such as for providing a refuse container, or for storing tapes, cassettes, CD's, or other items.

As seen in FIG. 1, it is contemplated that first member 17 can be conveniently removable from base member 18, or, alternatively, can be hingeably connected to base member 18 such as by the interaction of hinge bead 45 (seen in the broken out rear portion of first member 17) and the open recess or hinge gutter 47, respectively. Hinge gutter 47 may comprise a depression or corresponding recess and an upstanding tab (e.g. tab 48) to rotatably receive a unitary hinge bead 45 or (as indicated in FIG. 1) a plurality of fins or rounded nubs for providing a rotatable hinge-like arrangement adjacent the rear of member 17. In this way, member 17 can be rotated upwardly in a hinged manner to provide access to the interior of storage compartment 72 without removing member 17 from base member 15.

When mounted on base member 18, first member can preferably be supported by its lower margins 76 which generally correspond with at least portions of console ledge 74. The interaction between margins 76 and ledge 74 can comprise merely flat face to face surfaces, a tongue and groove fit, and/or a friction or snap-type interlock, as desired. Other manners of removably and hingeably connecting a first member 17 with base member 18 can also be substituted as desired. By making first member completely removable from its base, it will be understood that first member 17 can be utilized independently of its base as desired. For example, first member 17 can be placed on a seat or in other locations apart from the base as needed.

Focusing more on first member 17, there is preferably provided a forward receiving area or multiple use storage area 20 provided with a bottom wall 22 and an upwardly extending peripheral wall 24 about at least a portion of the bottom wall. With bottom wall 22, peripheral wall 24 preferably defines a receiving recess in forward receiving area 20 having a front surface (e.g., 26), a rear surface (e.g., 28), and oppositely disposed side surfaces (e.g., 30). A divider member 35 extends upwardly from bottom wall 22 within the receiving recess and generally between front and rear surfaces 26 and 28, respectively. It is preferred that divider 35 not extend fully between the front and rear surfaces, as it has been determined that a more adaptable multiple use storage area can be provided where a space (e.g., 40) is provided between the divider member 35 and at least one of the front and rear surfaces 26 or 28, respectively. Particularly, it is often desired to store longer, thinner items such as writing utensils, tire gauges and the like for easy access in a console device, and an appropriate space 40 can provide an appropriately sized receptacle for such applications. While a plurality of spaces 40 can be provided adjacent the front and rear surfaces, and, alternatively by providing openings or slots (not shown) within divider member 35, the embodiments shown in the examples illustrated show a preferred arrangement where a single space 40 is provided between the divider member and the rear surface 28.

As best seen in FIG. 1, divider member 35 is preferably provided with an arcuate cross-sectional conformation, which may most preferably be in the form of a sector of a circle. Where space 40 is to be provided between divider 35 and the rear surface, it is also preferable to provide the arcuate cross-sectional conformation of divider member 35 with its largest upwardly extending dimension being located adjacent front surface 26, and its smallest dimension located adjacent the bottom wall and closer to the rear surface. In this way, divider member 35 arches from front to rear in a generally downward direction, terminating short of rear surface 28 such that space 40 is provided between the smallest dimension of the divider (adjacent its rearward most section 42) and rear surface 28.

As illustrated, a fillet or curved connection 44 is preferably provided adjacent to the interface of bottom wall 22 and the upwardly extending peripheral wall 24. This rounded interface facilitates removal of small items from within the forward receiving area 20, and allows for easier cleaning of the console device to minimize build-up of dirt and the like. As illustrated, a transverse recess (e.g. 46) can also preferably be provided within space 40 to facilitate the storage of a writing device, tire gauge or the like within receiving area 20.

The arcuate cross-sectional conformation of divider member 35 also provides for the receipt and support of eyeglasses within the forward receiving area or recess, whereby the bridge portion of the eyeglasses can be effectively received on the divider member, which functions as a "bridge" or "nose" member. By appropriately sizing the dimensions of divider 35, an effectively universal bridge support can be provided to accommodate most sizes and configurations of eyeglasses in a supported manner which minimizes the need for the eyeglass lens surfaces to contact the console surfaces. For example, a nominal width (side to side) of the upper portions of divider 35 might be in a range of about 10–15 mm to accommodate a wide variety of bridges and pad widths. Similarly, the side to side width (e.g., W of FIG. 3) could be tapered so as to vary from the upper portions toward the lower portions of divider 35 to provide even more size tolerance of bridges, styles and shapes of eyeglasses.

Moreover, it is contemplated that, in some instances, it might be desirable to place a layer of resilient or soft, higher friction material, such as synthetic resins or the like, on the upper outer portions of divider 35 for better support or holding of an eyeglass bridge piece in use. Such treatment might include applying a layer of soft rubber or polymer to provide a more resilient friction surface for supporting the bridge portion of eyeglasses.

Consequently, forward receiving area 20 of the present invention provides a unique specialized support system for eyeglasses, while simultaneously featuring an effectively divided recess having relatively separate sectors for receiving coins, candy, tokens or other small items, and with at least one space ideally suited for storing writing utensils, tire gauges or other similar thin items.

Rearwardly of the forward receiving area 20 and behind the upstanding rail 58 is preferably provided a cup receiving area (e.g., 50) or similar opening for receiving the lower portions of at least one cup or other drinking vessel. The cup receiving area 50 preferably includes a bottom wall 52, front and rear walls 53 and 54, respectively, and oppositely disposed sidewalls 56. Optionally, mug handle windows 57 can be provided within sidewalls 56 to facilitate accommodation of drinking vessels with handles. Where several drinking vessels are to be accommodated within cup receiving area 50, it may also be preferred to include a central dividing member such as locator hump 89. As will be discussed further herein, the console device of the present invention may further include one or more adjustable cup holder arms (e.g. arm 60 seem in FIG. 1) to accommodate a variety of cups and similar devices.

Figure 2:
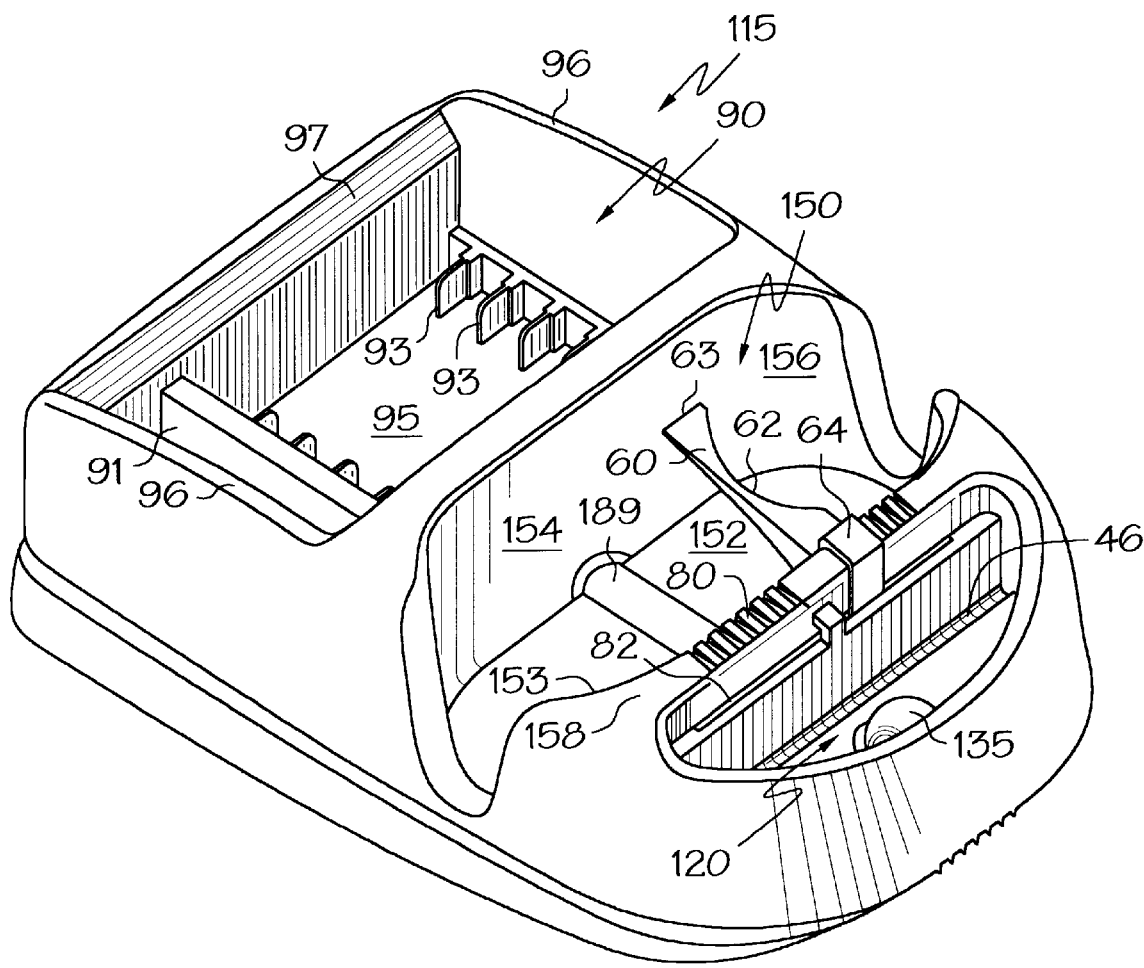
FIG. 2 is a front perspective view of another embodiment of a console device made in accordance with the present invention.
Figure 3:
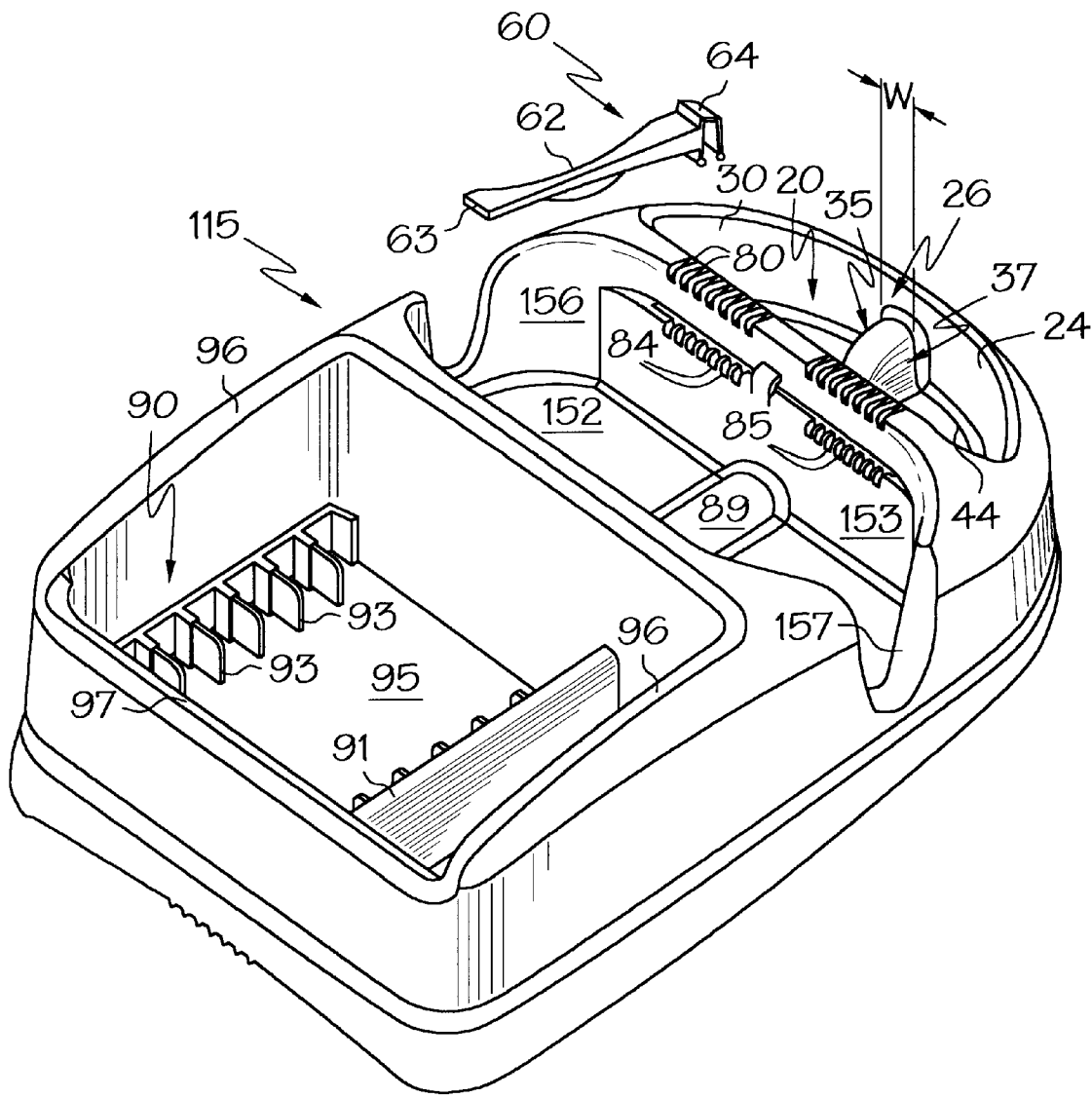
FIG. 3 is a partially exploded rear perspective of the console device of FIG. 3.
Figure 4:
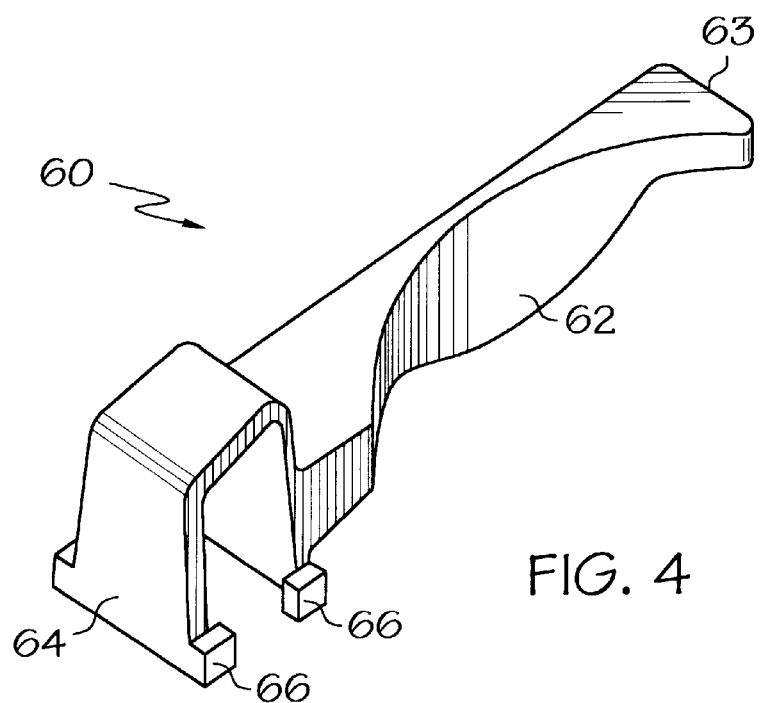
FIG. 4 is an enlarged, top perspective view of a preferred embodiment of an adjustable cupholder arm of the present invention.
Figure 5:
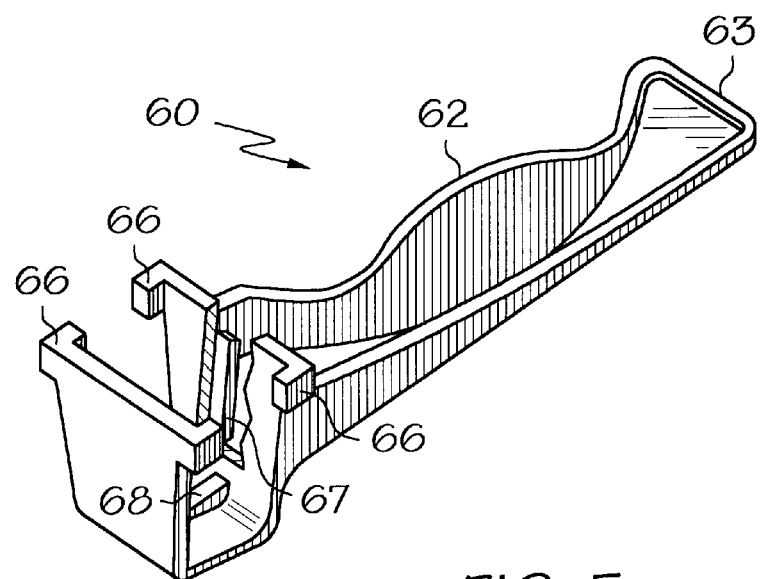

FIGS. 2 and 3 show another embodiment of a console device 115 of the present invention, which also includes a forward receiving area 120 of the present invention, as well as cup receiving area 150 essentially as described above with respect to area 50. FIGS. 4 and 5 show details of a preferred embodiment of an adjustable cup holder arm 60 as contemplated herein. In conjunction with FIG. 1, all of these drawing figures show additional details of a preferred arrangement for providing at least one adjustable cup receiving area. Because the details of these embodiments are quite similar, they will be discussed together herein.

Particularly, it is preferred to provide an adjustable cupholder arm 60 which extends between the front and rear walls 53/153 and 54/154 of cup receiving area 50/150, respectively, in these embodiments, and which includes an inner edge 62 which defines an adjustable portion of the cup receiving area 50. As illustrated, where cup receiving area 50 is to accommodate a pair of drinking vessels, a pair of adjustable arms 60 having essentially mirror image structures are preferably provided. The top and bottom perspective views of a preferred structure for adjustable arm 60 is shown in FIGS. 4 and 5. In this preferred example, adjustable arm 60 comprises a generally U-shaped yoke member 64 having a plurality of inwardly disposed lugs 66 formed adjacent the lower portions of the yoke. On the inner upper surface of the U-shaped member 64, one or more locking tangs or teeth 68 are also preferably provided. On the outer inside surface of member 64 is also preferably formed at least one lock protuberance (e.g. 67 as seen in the broken away portion of FIG. 5).

Adjustable arm 60 includes a distal end 63 and an arcuate inner edge 62 for providing a surface for defining the adjustable portion of the cup receiving area opposite a corresponding sidewall 56. As best illustrated in FIGS. 2 and 3, a plurality of adjustment openings or recesses 80 are provided along the upper portions of rail 58/158 to selectively interact with the locking tangs or teeth 68 of adjustable arm 60 in use. Particularly, the U-shaped yoke member 64 is mounted over rail 58 such that its lower portions and lugs 66 are snapped through one or more guide slots (e.g., guide slot 82 and locking slot 84). While a pair of oppositely disposed slots spaced on either side of the rail 58/158 are preferred, it is contemplated that a single slot (e.g., locking slot 84) may suffice is some arrangements. It is contemplated that the resiliency of the U-shaped member 64 will allow the lugs 66 to be snapped through slots 82 and 84 for insertion without damage, while lugs 66 will prevent inadvertent removal of the adjustable arm from the slots accordingly.

As best seen in FIG. 3, a plurality of locking teeth receivers or openings 85 are preferably provided along the lower portions of locking slot 84 in spaced relationship. As will be appreciated, when adjustment of arm 60 is desired, the arm can be raised slightly on rail 58 such that lock protuberance 67 will be disengaged from a corresponding receiver 85 within slot 84, and locking teeth 68 are disengaged from adjustment recesses 80 to allow for lateral adjustment as desired. In that raised condition, lugs 66 continue to prevent withdrawal of the adjustable arm 60 from the console device (15/115) as a result of interference of the lugs and the upper portions of locking slot 84.

Once the adjustable arm 60 is moved to its desired position, it is again lowered into locked condition, wherein locking teeth 68 interlock with a corresponding adjustment recess 80 and protuberance 67 is received in a corresponding receiver 85. In this way, selective adjustment and stable locking of the holder arms 60 relative to sidewalls 56 and the console device overall is provided in a convenient and reliable manner. While one set of interlocking elements (e.g., tooth 68/recesses 80, or protuberance 67/receivers 85) may be sufficient in most applications, the illustrated combination of two sets and the retainer lugs 66 is preferred to provide a more stable and reliable lockable adjustment arrangement.

As also seen in the various views, it is preferred that adjustable arms 60 not extend the entire distance between the front and rear walls of cup receiving area 50, and that some space is provided between distal end 63 and rear wall 54/154. In this way, the convenience of adjustability is maximized, and additional storage space can be provided. For example, depending upon the spacing designed into the device between distal end 63 and the surrounding wall of the cup receiving area 50/150, space for maps, small books, loose papers or the like can be provided, further enlarging the adaptability and universal appeal of the console device. It is also contemplated that an adjustable arm 60 could alternatively be mounted in conjunction with rear wall (e.g., 54/154) in other embodiments of the present invention.

In the embodiments shown in FIGS. 2, 3, and 6–8, there is an additional rearward receiving area (e.g., 90) which may include several storage spaces defined by one or more partitions (e.g., 91). In a preferred arrangement, the rearward receiving area 90 may include various storage structures such as alignment nubs 93 along bottom wall 95 for facilitating the storage of cassette tapes and CD jewel boxes. Surrounding the peripheral edges of bottom 95 are illustrated the upwardly extending side walls having oppositely disposed side beveled edges 96 and a rear upper edge 97. It is preferred that the rear edge 97 be provided with a slightly beveled or angled surface as illustrated for supporting a removable storage member or bin 100 in one of its stable storage positions, as seen best in FIG. 8 and as will be described below.

Figure 6:
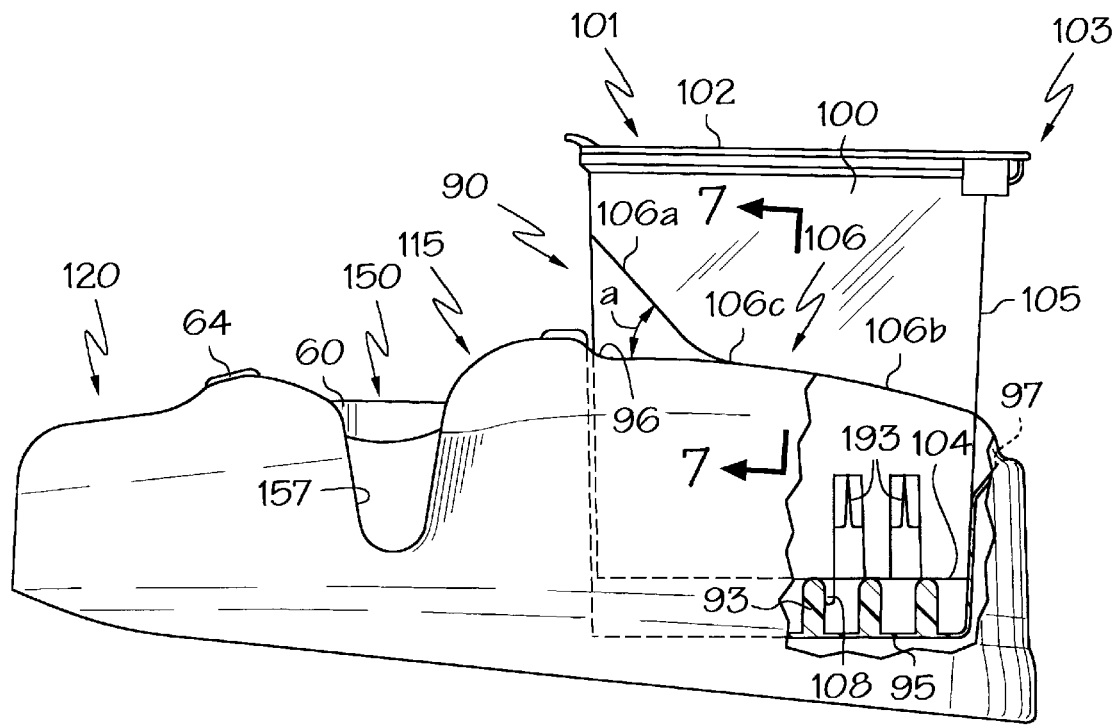
FIG. 6 is a partially broken out side elevational view of the console device of FIG. 3, illustrated with a removable storage member in its rear receiving area and shown in upright position.
Figure 7:
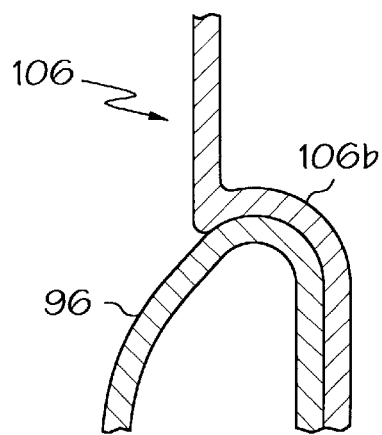
FIG. 7 is a partial cross-sectional view of the interface between the upper edges of the console device and the support rail of the storage bin member, taken along line 7—7 of FIG. 6.
Figure 8:
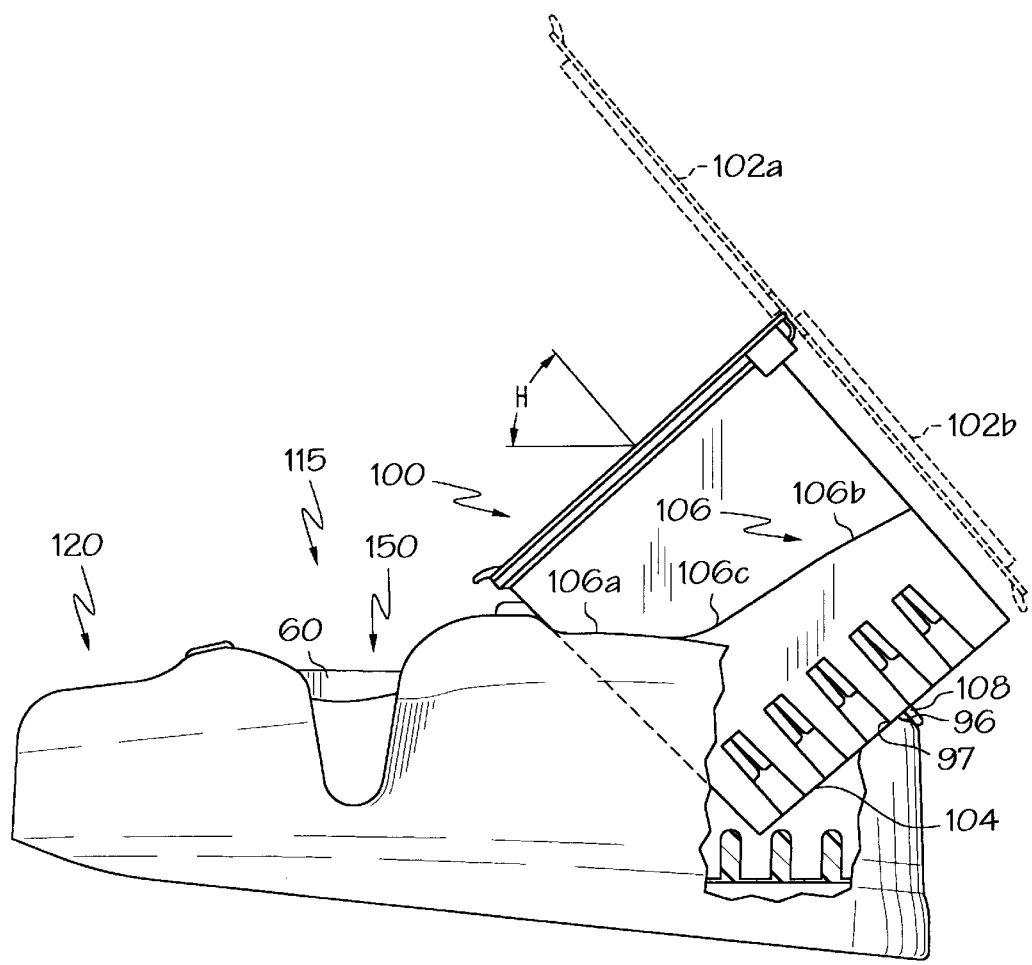
FIG. 8 is a partially broken out side elevational view of the console device of FIG. 7, illustrating the storage member in an alternatively forwardly angled position.

As best seen in FIGS. 6 and 8, removable storage member or bin 100 preferably includes a generally open top 101, a bottom wall 104 and sidewalls including rear wall 105. Optionally, open top 101 can preferably be provided with a lid (e.g., 102), which in turn can be provided with a hinge member 103 arranged to allow for the lid to be selectively locked in open condition and/or disengaged from its rotating connection so that it can be moved to a position which does not substantially obstruct the open top. Particularly, it is contemplated that the hinge connection 103 might include oppositely disposed pins or the like (not shown) which provide a rotatable connection which can be selectively disengaged, with the pins then sliding in a track or grooves along opposite sides of the lid to allow the lid to be slided downwardly from open condition along rear wall 105. Alternatively, hinge connection 103 might allow for lid 102 to be rotated approximately 180° (shown in phantom lines in FIG. 8). It is contemplated that any number of detachable or multi-directional hinge type connections can be utilized to facilitate placing the lid in nonobstructing yet captive condition.

Turning specifically to FIG. 6, removable storage member 100 is shown in a first stable and upright position, wherein it is at least partially received within rearward receiving area 90, with its bottom wall 104 resting upon the upper portions of alignment nubs 93. In particular arrangements, it may be preferred to provide recesses in the bottom wall 104 of bin 100 to correspond with and accommodate structures, (such as partition 91) within rearward receiving area 90. In order to allow storage bin 100 to be more fully nested within rearward receiving area 90, for example, bin 100 would have to include a slot (not shown) large and deep enough to slide over partition 91 without physical interference. In this regard, bin 100 might preferably be formed with bottom portions (e.g. bottom 95 and the lower portions of the side, front and rear walls) which closely match the corresponding interior portions of receiving area 90 of the console device, with corresponding alignment rubs (e.g. see 193) and the slot discussed to correspond with partition 91. Such recess or recesses can allow bin 100 to fit over such structures in a telescoped condition, enabling bin 100 to be more fully received and supported within receiving area 90.

Additionally, storage bin 100 is preferably provided with an outwardly extending support rail 106 formed along the outer portions of its outside sidewalls. Support rail 106 could be provided in the form of an enlarged upper portion or ledge of bin 100 (as seen best in FIGS. 6 and 7), or could be formed as an outwardly extending lip (not shown) along at least portions sidewalls of the bin as appropriate. In the first, upright position shown in FIG. 6, a portion of support rail 106 (i.e., 106b) corresponds to and is supported by the upper edge 96 of the rearward receiving area 90. Consequently, the removable storage bin is received and supported in a stable upright position, wherein access to its contents can be obtained by opening lid 102 from above. It should also be noted that extending outwardly from the exterior of bottom wall 104 of removable storage member 100 is a lateral support ledge 108.

Turning now to FIG. 8, a second and distinct stable storage position of removable storage member 100 is illustrated. Particularly, storage bin 100 has been received within rearward receiving area 90 in a forwardly angled position, whereby its open top will be oriented towards the front of console device 15, and toward the forward receiving area 120 thereof. As will be noted, support rail 106 preferably comprises at least two sections, 106a and 106b, which can be connected at portion 106c such that they are oriented relative to one another at an angle α corresponding to the relative angle θ of storage bin 100 relative to console device 115.

In the forwardly angled position shown in FIG. 8, removable storage bin 100 is supported in part by interaction of support rail 106a and the side upper edges 96 of rearward receiving area 90. Additionally, support ledge 108 similarly corresponds with and is supported by interaction with rear edge 97. This support interaction can be augmented by providing a groove (not shown) along rear edge 97 into which support ledge 108 can be received, although manufacturing tolerances and ease of use may make a positive locking arrangement undesirable. Proper design of the sizes and locations of the alignment nubs 93 on bottom wall 95 can also enable support and interaction between nubs 93 and the bottom corner of storage member 100, as illustrated.

Consequently, a second distinct and stable storage position is provided for storage member 100, whereby a forwardly angled position is provided for facilitating easy access to the materials stored therewithin in use. It is also contemplated that other angled positions could similarly be provided, if desired, in order to accommodate more confined or different spacing arrangements relative to a vehicle dashboard or the like.

Figure 9:
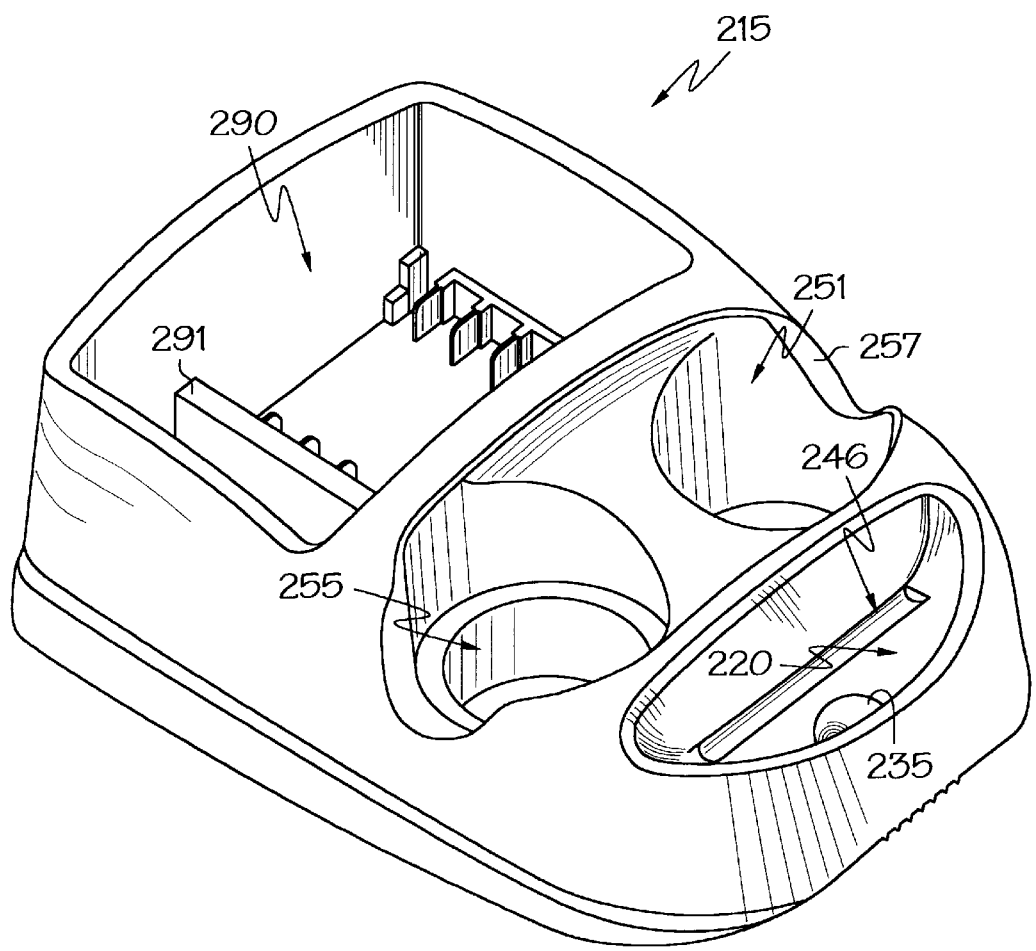
FIG. 9 is a front perspective view of yet another embodiment of a console device made in accordance with the present invention.

Finally, FIG. 9 shows yet another embodiment of a console device 215 made in accordance with the present invention, wherein the forward receiving area 220 is provided with the multiple use storage area and divider characteristics of the present invention, and the rearward receiving area 290 is provided for selectively receiving a removable storage member or bin (not shown) similar to that described above.

In contrast to the embodiments discussed above, cup receiving area 251 of the embodiment shown in FIG. 9 does not include the adjustable arm arrangement of the present invention. In this embodiment, permanently molded, stepped cup receiving areas (e.g. 255) are provided to enable the support of drinking vessels of differing sizes and shapes, while the balance of console device 215 incorporates the other unique aspects of the present invention. This embodiment is included to emphasize that the various aspects of the three receiving areas of the present (i.e., the forward receiving area, cup receiving area, and rearward receiving area) can be mixed in various combinations to provide console devices at varying price points and sizes. For example, while the console device shown and described in FIG. 1 above might be preferred for use in trucks, vans, or other large vehicles, the console device embodiments shown in FIGS. 2–3 and 6–8 or, alternatively, FIG. 9, might be more desirable for smaller vehicles. Similarly, while the first two embodiments may be preferred for applications where a larger variety of drinking vessels may be accommodated, the embodiment of FIG. 9 may be more appropriate for lower cost requirements, or for consistent use by fewer people with only one or two varieties of drinking vessels.

Having shown and described the preferred embodiments of the present invention, further adaptions of the console device described herein can be accomplished by appropriate modifications by one of ordinary skill in the art without departing from the scope of the present invention. A number of such alternatives and modifications have been described herein, and others will be apparent to those skilled in the art. Accordingly, the scope of the present invention should be considered in terms of the following claims, and is understood not to be limited to the details of the structures and embodiments shown and described in the specification and drawings.

What is claimed is:

1. A console device for vehicles comprising at least one area for receiving the lower portions of a cup or other drinking vessel, said area having a bottom wall, front and rear walls, and at least one side wall member, an adjustable portion of said cup receiving area defined by said side wall member and a single holder arm generally extending between said front and rear walls and being adjustably attached to one of said front and rear walls wherein said side wall member extends to a height at least equal to the height of the single holder arm, said cup holder arm having an inner edge, and a plurality of interlocking elements provided on said holder arm and the wall to which said holder arm is attached for selective locking attachment, wherein adjustment of said inner edge of said single holder arm relative to said side wall member defines the adjustable cup portion for receiving a cup between said inner edge and said side wall member.

2. The console device of claim 1, wherein said arm is attached to said front wall by a generally u-shaped member on said arm.

3. The console device of claim 1, wherein said interlocking elements comprise at least one tooth and a plurality of openings into which said at least one tooth can selectively interlock.

4. The console device of claim 1, further comprising a pair of openings for receiving a drinking vessel, and a pair of independently adjustable cup holder arms.

5. The console device of claim 1, further comprising a corresponding protuberance and a plurality receivers for selectively interlocking said adjustable cup holder arm in a desired position relative to said side wall member.

6. The console device of claim 1, wherein said cup receiving area is adapted to receive two cups, said console including a second holder arm to define a second adjustable portion therewithin.

7. The console device of claim 6, wherein said second holder arm is also adjustably attached to one of said front and rear walls, and includes an inner edge which can be adjusted relative to one of said front, rear or side wall members to adjustably define a second cup receiving area.

8. A console device for vehicles comprising a multiple use storage area having a bottom wall and an upwardly extending peripheral wall about at least a portion of said bottom wall defining a receiving recess, a divider member extending upwardly from said bottom wall within said recess and between said front and rear surfaces, said divider member having an arcuate cross-sectional conformation which arches from a larger upwardly extending dimension adjacent one of said front and rear surfaces in a generally downward direction and terminating short of the other of said front and rear surfaces, and providing a space on said bottom wall between the smaller upwardly extending dimension of said divider member and at least one of said front and rear surface, and said divider member is provided with an outer surface for supporting the bridge portion of eyeglasses, the outer surface comprises a resilient friction surface.

9. A console device for vehicles, said console device comprising:
   a multiple use storage area having a bottom wall and an upwardly extending peripheral wall about at least a portion of said bottom wall defining a forward receiving area having front and rear surfaces, a divider member extending upwardly from said bottom wall within said forward receiving area and at least partially between said front and rear surfaces, said divider member having an arcuate cross-sectional conformation which arches from its largest upwardly extending dimension adjacent one of said front and rear surfaces in a generally downward direction toward said bottom wall and its smallest dimension adjacent the other of said front and rear surfaces, said divider member further having an outer surface which includes a resilient friction surface; and
   at least one opening for receiving the lower portions of a cup or other drinking vessel, said opening having a bottom wall, front and rear walls, and at least one side wall member generally defining a cup receiving area, an adjustable cup holder arm extending at least partially between said front and rear walls and having an inner edge for defining an adjustable portion of said cup receiving area, said holder arm being adjustably attached to one of said front and rear walls, and a plurality of interlocking elements provided on said holder arm and the wall to which said holder arm is attached for selective adjustment and locking of said holder arm relative to said side wall member.

10. A console device for vehicles, said console device comprising: a multiple use storage area having a bottom wall and an upwardly extending peripheral wall about at least a portion of said bottom wall defining a forward receiving area having front and rear surfaces, a divider member extending upwardly from said bottom wall within said forward receiving area and at least partially between said front and rear surfaces, said divider member having a width appropriately sized to receive and support eyeglasses, and an arcuate cross-sectional conformation which arches from its largest upwardly extending dimension adjacent one of said front and rear surfaces in a generally downward direction toward said bottom wall and its smallest dimension adjacent the other of said front and rear surfaces; and
   at least one opening for receiving the lower portions of a cup or other drinking vessel, said opening having a bottom wall, front and rear walls, and at least one side wall member generally defining a cup receiving area wherein said side wall member extends to a height at least equal to the height of an adjustable cup holder arm, said adjustable cup holder arm extending at least partially between said front and rear walls and having an inner edge for defining an adjustable portion of said cup receiving area, said holder arm being adjustably attached to one of said front and rear walls, and a plurality of interlocking elements provided on said holder arm and the wall to which said holder arm is attached for selective adjustment and locking of said holder arm relative to said side wall member.

11. The console device of claim 10, wherein said divider member terminates short of the other one of said front and rear surfaces such that a space on said bottom wall is provided between said divider member and said other one of said front and rear surfaces.

12. The console device of claim 10, wherein said divider member extends from said front surface to said bottom wall in an arcuate cross-sectional conformation having its largest dimension adjacent said front surface and its smallest dimension adjacent the bottom wall closer to said rear surface, and terminating short of said rear surface such that said space is provided between the smallest dimension of said divider and the rear surface.

13. The console device of claim 10, further comprising a rounded attachment interface between said bottom wall and said peripheral wall.

14. The console device of claim 10, wherein said arm is attached to said front wall by a generally u-shaped member on said arm.

15. The console device of claim 10, wherein said interlocking elements comprise at least one tooth and a plurality of openings into which said at least one tooth can selectively interlock.

16. The console device of claim 10, further comprising a pair of cup receiving areas for receiving a drinking vessel, and a pair of independently adjustable cup holder arms.

17. The console device of claim 10, further comprising a plurality of corresponding interlocking devices for selectively interlocking said adjustable cup holder arm in a desired position relative to said side wall member.

18. The console device of claim 10, wherein said console device further comprises a rearward receiving area, and a removable storage member selectively and at least partially received in said rearward receiving area in one of a plurality of stable and distinct use positions, and wherein said plurality of stable and distinct use positions includes a forwardly angled position.

19. The console of claim 10, further comprising a removable storage member selectively and at least partially received in one of a plurality of stable and distinct use positions.

20. The console of claim 19, wherein said storage member further comprises a generally open top and a rotatable lid structure which can be selectively moved between opened and closed positions.

21. The console of claim 20, wherein said lid is provided with a hinged connection to said storage member and said hinged connection includes a disabled condition where the lid can be moved out of rotating connection adjacent said open top, whereby said lid does not substantially obstruct said open top.

22. A console device for vehicles, said console device comprising:

a multiple use storage area having a bottom wall and an upwardly extending peripheral wall about at least a portion of said bottom wall defining a receiving recess having front and rear surfaces, a divider member extending upwardly from said bottom wall within said recess and between said front and rear surfaces, said divider member having an arcuate cross-sectional conformation, and a space along said bottom wall between said divider member and at least one of said front and rear surfaces;

at least one opening for receiving the lower portions of a cup or other drinking vessel, said opening having a bottom wall, front and rear walls, and at least one side wall member generally defining a cup receiving area, an adjustable cup holder arm extending between said front and rear walls and having an inner edge for defining an adjustable portion of said cup receiving area, said holder arm being adjustably attached to one of said front and rear walls, and a plurality of interlocking elements provided on said holder arm and the wall to which said holder arm is attached for selective adjustment and locking of said holder arm relative to said side wall member; and a generally open receiving area, and a removable storage member selectively and at least partially received in said receiving area in one of a plurality of stable and distinct use positions relative to said receiving area, wherein said receiving area comprises side walls having upper edges, and said storage member comprises a support rail on one or more of its wall members which corresponds to and is supported by an upper edge of a receiving area when said storage member is in its forwardly angled position.

23. The console of claim 22, wherein said support rail comprises a plurality of sections, such that one section also corresponds to and is supported by an upper edge of said receiving portion when said storage member is in a position distinct from said forwardly angled position.

24. A console device for vehicles, said console device comprising:

a forward receiving area having a bottom wall and an upwardly extending peripheral wall about at least a portion of said bottom wall defining a receiving recess having front and rear surfaces, a divider member extending upwardly from said bottom wall within said recess and between said front and rear surfaces, said divider member having an arcuate cross-sectional conformation, and a space along said bottom wall between said divider member and at least one of said front and rear surfaces;

at least one opening for receiving the lower portions of a cup or other drinking vessel, said opening having a bottom wall, front and rear walls, and at least one side wall member generally defining a cup receiving area, an adjustable cup holder arm generally extending between said front and rear walls and having an inner edge for defining an adjustable portion of said cup receiving area, said holder arm being adjustably attached to one of said front and rear walls, and a plurality of interlocking elements provided on said holder arm and the wall to which said holder arm is attached for selective adjustment and locking of said holder arm relative to said side wall member; and a generally open rearward receiving area, and a removable storage member selectively and at least partially received in the console in one of a plurality of stable and distinct use positions, wherein said storage member comprises a bottom and a plurality of wall members extending away from said bottom wall to define a storage space there within and a support ledge adjacent its bottom which can selectively interact with at least a portion of the rearward receiving area to maintain a forwardly angled use position.

\* \* \* \* \*